(12) United States Patent
Testa

(10) Patent No.: US 7,246,075 B1
(45) Date of Patent: Jul. 17, 2007

(54) SYSTEM FOR SCHEDULING MULTIPLE TIME DEPENDENT EVENTS

(75) Inventor: Leonard J. Testa, Oak Ridge, NC (US)

(73) Assignee: North Carolina A&T State University, Greensboro, NC (US)

(*) Notice: Subject to any disclaimer, the term of this patent is extended or adjusted under 35 U.S.C. 154(b) by 534 days.

(21) Appl. No.: 09/602,515

(22) Filed: Jun. 23, 2000

(51) Int. Cl.
*G06F 17/30* (2006.01)

(52) U.S. Cl. .................................. 705/8; 705/9

(58) Field of Classification Search .............. 705/8, 705/9; 707/3, 104.1
See application file for complete search history.

(56) References Cited

U.S. PATENT DOCUMENTS

| | | | | |
|---|---|---|---|---|
| 4,935,877 A | * | 6/1990 | Koza | 706/13 |
| 5,121,495 A | * | 6/1992 | Nemes | 707/3 |
| 5,136,686 A | | 8/1992 | Koza | 395/13 |
| 5,222,191 A | | 6/1993 | Enomoto | 395/3 |
| 5,241,465 A | * | 8/1993 | Oba et al. | 705/8 |
| 5,319,781 A | | 6/1994 | Syswerda | 705/8 |
| 5,408,663 A | | 4/1995 | Miller | 718/104 |
| 5,442,561 A | * | 8/1995 | Yoshizawa et al. | 700/100 |
| 5,581,657 A | | 12/1996 | Lyon | 395/13 |
| 5,586,219 A | * | 12/1996 | Yufik | 706/14 |
| 5,890,134 A | * | 3/1999 | Fox | 705/9 |
| 5,893,120 A | * | 4/1999 | Nemes | 707/206 |
| 5,897,629 A | | 4/1999 | Shinagawa et al. | 706/13 |
| 5,913,201 A | * | 6/1999 | Kocur | 705/9 |
| 6,070,144 A | * | 5/2000 | Ginsberg et al. | 705/9 |
| 6,272,483 B1 | * | 8/2001 | Joslin et al. | 706/62 |
| 6,418,398 B1 | * | 7/2002 | Dueck et al. | 702/181 |
| 6,490,566 B1 | * | 12/2002 | Schmidt | 705/8 |
| 6,516,310 B2 | * | 2/2003 | Paulley | 707/2 |
| 6,606,529 B1 | * | 8/2003 | Crowder et al. | 700/100 |
| 2002/0065700 A1 | * | 5/2002 | Powell et al. | 705/9 |
| 2002/0116357 A1 | * | 8/2002 | Paulley | 707/1 |
| 2004/0034556 A1 | * | 2/2004 | Matheson et al. | 705/8 |

FOREIGN PATENT DOCUMENTS

JP 07105288 * 4/1995

OTHER PUBLICATIONS

Hillier, Fredericl S., et al., "Introduction to Operations Research", McGraw-Hill, Inc, 1995, 6th Edition, pp. 833-852.*
Herrmann, JW, et al., "Design of Material Flow Networks in manufacturing facilities", Science Direct, 1995, pp. 1-17, retrieved from: Dialog, file 15.*
Kobti, Ziad, "Implementation of Genetic Algorithms in optical wavelength ring routed network design", Masters Abstracts, 1999, pp. 1-2, retrieved from: Dialog, file 19.*
Thesis of Leonard J. Testa entitled "Evolutionary Algorithms For Solving Large Time Dependent Traveling Salesmen Problems".

* cited by examiner

*Primary Examiner*—B. Van Doren
(74) *Attorney, Agent, or Firm*—MacCord Mason PLLC

(57) ABSTRACT

A scheduling system for choosing the most appropriate heuristic for solving time-dependant scheduling problems. The invention includes a means for selecting the most appropriate heuristic method for generating a schedule from an enumerative ("brute force") method, a dynamic programming method, and a genetic method. The invention further includes a hashing function that is capable of detecting duplicate solutions generated by the dynamic programming module and a height-balanced binary tree for providing search insertion and deletion operations.

1 Claim, 2 Drawing Sheets

US 7,246,075 B1

SYSTEM FOR SCHEDULING MULTIPLE TIME DEPENDENT EVENTS

BACKGROUND OF THE INVENTION (1) Field of the Invention

This invention relates to a system for scheduling multiple events. More particularly, the invention relates to a system for scheduling multiple events in view of a series of constraints imposed upon the schedule. Still more particularly, the present invention describes a system for scheduling multiple events while at the same time optimizing some user-defined measure of the schedule's quality, such as time to complete the schedule or cost to complete the schedule.

(2) Description of the Prior Art

Scheduling problems are exemplified by the traditional traveling salesman problem (TSP). The goal of the TSP is to find the minimal cost tour of n cities in which a salesman visits each city exactly once and returns to the starting city at the end of the tour. The time dependent TSP (TDTSP) is a variant of the TSP in which the salesman must still visit each city, but the cost of traveling from one city to the next depends on both the distance between cities and the time of day when the travel takes place. When solving the TDTSP, a city—or "node"—is typically designated the "depot" node, where the salesman begins and ends his tour.

Many real-world instances of the TDTSP are concerned with scheduling time-dependent tasks, including the process of scheduling manufacturing jobs on a machine with time-dependent setup costs. One special instance of the TDTSP, known as the deliveryman problem (DMP), has been used to route guided vehicles through a manufacturing system. Other applications of the TDTSP include routing data through a network, creating timetables for university exams, and scheduling vehicles and crews.

Certain properties exploited in TSP heuristics cannot be extended to the TDTSP. Thus, different heuristics are needed to generate solutions to general TDTSPs with more than a few dozen cities.

One approach to solving both the TSP and TDTSP is the adoption of enumerative or so-called "brute force" methods. These methods simply search (i.e., enumerates) every possible solution within the solution space. The obvious drawback to these methods is that they are not practical for most real-world problems, as the search space is too large to be enumerated.

Another method is the random search. Because a random search cannot efficiently save every promising solution it finds, simple random searches do no better than enumerative schemes. While random searches can search a large space effectively, they lack the tools necessary to exploit the more promising areas of that space.

Malandraki and Daskin described several straightforward modifications of the TSP heuristic to the TDTSP, including the standard nearest-neighbor (NN), a variation, known as NN2 that evaluates the cost of paths when each city is guaranteed to be the first city visited after leaving the depot, and a probabilistic nearest neighbor heuristic (NNR) that selects the next city to be visited randomly, according to a user-defined probability function. Test results on problems of up to 25 cities indicate that NN2 performs the best of the three heuristics.

Various heuristics based on mixed integer linear programming (MILP) formulations have also been proposed for the TDTSP. Vander Weil and Sahinidis separate the TDTSP into two sub-problems: one sub-problem containing additional constraints that place an upper bound on the travel cost; and the other sub-problem containing additional constraints that form a lower bound. The algorithm attempts to solve each sub-problem and terminates when the upper and lower bounds are within some user-defined value. Malandraki and Daskin disclose a MILP relaxation technique that removes many of the constraints found in the exact MILP formulation and then adds the constraints back as feasible solutions are found. The algorithm then re-solves the equations to see if the constraints hold, and the process continues until either no constraints remain or one of the constraints is violated.

Malandraki and Dial describe a heuristic based on an exact dynamic programming algorithm that generates good solutions to TDTSPs of up to 55 cities using relatively little processor time, and the quality of the solutions are superior to that of the MILP relaxation technique.

The scheduling systems of the prior art are ponderous and require large amounts of storage space and central processing unit (CPU) time, thus making them costly and inefficient. Therefore, what is needed is a scheduling system that is capable of solving TSPs and TDTSPs economically. What is also needed is a scheduling system that can—based upon the parameters and constraints present in the schedule—select the most appropriate heuristic for solving scheduling problems.

SUMMARY OF THE INVENTION

The present invention is directed to an economical scheduling system that is capable of choosing the most appropriate heuristic for solving time-dependent scheduling problems. The present invention addresses these problems and others by combining several heuristic methods with a means for selecting the most appropriate method from enumerative or "brute force", dynamic programming, and genetic methods.

The present invention includes a new dynamic programming (DP) heuristic that is capable of generating exactly the same solutions, using less memory and CPU time than the prior-art DP heuristics. The new heuristic outperforms the prior-art heuristic on problems with 50 or more cities and can generate good solutions on problems of up to 400 cities with reasonable processor and memory usage. This allows researchers to solve much larger TDTSPs, as the memory and CPU savings can be used to search a wider section of the solution space, which generally leads to better solutions.

The prior-art exact DP solution to the TDTSP requires exponential CPU time and memory as the number of cities increases. These requirements cannot be met for any TDTSP with more than a few dozen cities. The restricted dynamic programming heuristic of the prior art reduces the above time and memory requirements by retaining at the end of each stage only a user-defined number of lowest-cost unique partial tours generated during a given stage. At any stage i, the user-defined number of lowest-cost unique partial tours is saved at the end of stage i−1 and used to construct all possible tours that contain one additional city not yet visited. The designated number of lowest-cost partial tours is then saved to start the next stage.

In contrast, the present invention makes use of hashing functions instead of sorting to identify duplicate values of the set of cites already visited and the current site to be visited as they are generated, thus reducing the amount of CPU time the heuristic needs. AVL trees are used to hold only the user-designated number of lowest-cost intermediate partial paths generated during each stage, thus resulting in significant memory savings. With reasonable assumptions, the asymptotic running time of the heuristic of the present invention is the same as the prior-art heuristic, although the heuristic of the present invention though runs faster in almost all cases. In addition, the worst-case memory usage in the instant heuristic is better than that of the prior art heuristic for large numbers of sites.

As previously noted, exact algorithms for a large number of real-world problems often require computing resources that are difficult or impossible to obtain. For many of these real-world problems, including the TDTSP, efficient algorithms have been developed which provide approximate solutions using reasonable amounts of resources. Rather than an exhaustive search of the solution space, most of this efficiency is obtained by performing only a limited search. Genetic Algorithms (GAs) are one method of directing this search. GAs are robust, stochastic algorithms that model the processes of evolution and Darwinian competition. The process of finding good solutions uses natural selection as a metaphor: better solutions survive and reproduce, with their positive characteristics mingling to form (hopefully) more-fit offspring. Less-fit solutions, on the other hand, die. While GAs make use of randomization in their search, they also can make use of the promising characteristics they find, making them especially popular for function optimization problems such as routing, scheduling, and other forms of transportation problems.

Because genetic algorithms originally used biological processes as their inspiration, it is not surprising that many of the terms used to describe GAs come from their biological counterparts. The items in a genetic algorithm that represent solutions to the problem are called individuals or, alternatively, strings or chromosomes. A collection of these items is known as the population or pool. In general, each solution consists of a single chromosome and the chromosomes consist of genes at fixed positions within the chromosome called loci. Each gene controls one or more characteristics of the chromosome, and thus the value of the gene contributes information to the overall solution. The fitness of a particular chromosome, known as its phenotype, is defined by a user-supplied fitness function. This fitness function is the final judge of the solution quality embedded in the chromosome. At each step of the genetic algorithm, individuals are evaluated according to the fitness function. A new population is then formed by selecting some number of the most-fit individuals from the current population for reproduction.

The basic unit of a GA is a chromosome consisting of one or more genes that are represented as a variable length binary vector. By convention, GAs with genes that contain non-binary representations are referred to as evolutionary algorithms (EAs). The algorithms used in the present invention are evolutionary algorithms.

The initial population for the GA can be created in many ways. Probably the simplest approach is to initialize the values of each of the genes randomly. Another alternative, used extensively in the present invention, is to have some other algorithm find an initial pool of good solutions which the GA can then attempt to improve. The GA module of the present invention includes an algorithm, operators, adaptive operator probabilities and population re-initiators.

Finally, the invention includes a means for selecting among the enumerative, dynamic programming, and genetic modules to direct the scheduling task to the module best suited for the task.

Accordingly, one aspect of the invention is to provide a scheduling system for scheduling a plurality of time-dependent tasks, the scheduling system comprising: an enumerative "brute force" module; a dynamic programming module; a genetic module; and a partitioner module for selecting one of said brute force module, said dynamic programming module, or said genetic module to generate a schedule for performing the plurality of time-dependent tasks.

Another aspect of the present invention is to provide a dynamic programming module adapted to provide at least one solution for a scheduling problem, having a hashing function capable of detecting duplicate solutions generated by the dynamic program module and a height-balanced binary tree for providing search insertion and deletion operations.

Yet another aspect of the invention is to provide a scheduling system for scheduling a plurality of time-dependent tasks, the scheduling system comprising: an enumerative "brute force" module; a dynamic programming module adapted to provide at least one solution for a scheduling problem, having a hashing function capable of detecting duplicate solutions generated by the dynamic program module and a height-balanced binary tree for providing search insertion and deletion operations; a genetic module; a partitioner module for selecting one of the brute force module, the dynamic programming module, or the genetic module to generate a schedule for performing the plurality of time-dependent tasks; and a constraints file for providing an input to the partitioner module.

These and other aspects of the present invention will become apparent to those skilled in the art after a reading of the following description of the preferred embodiment when considered with the drawing.

DETAILED DESCRIPTION OF THE PREFERRED EMBODIMENT

Figure 1:
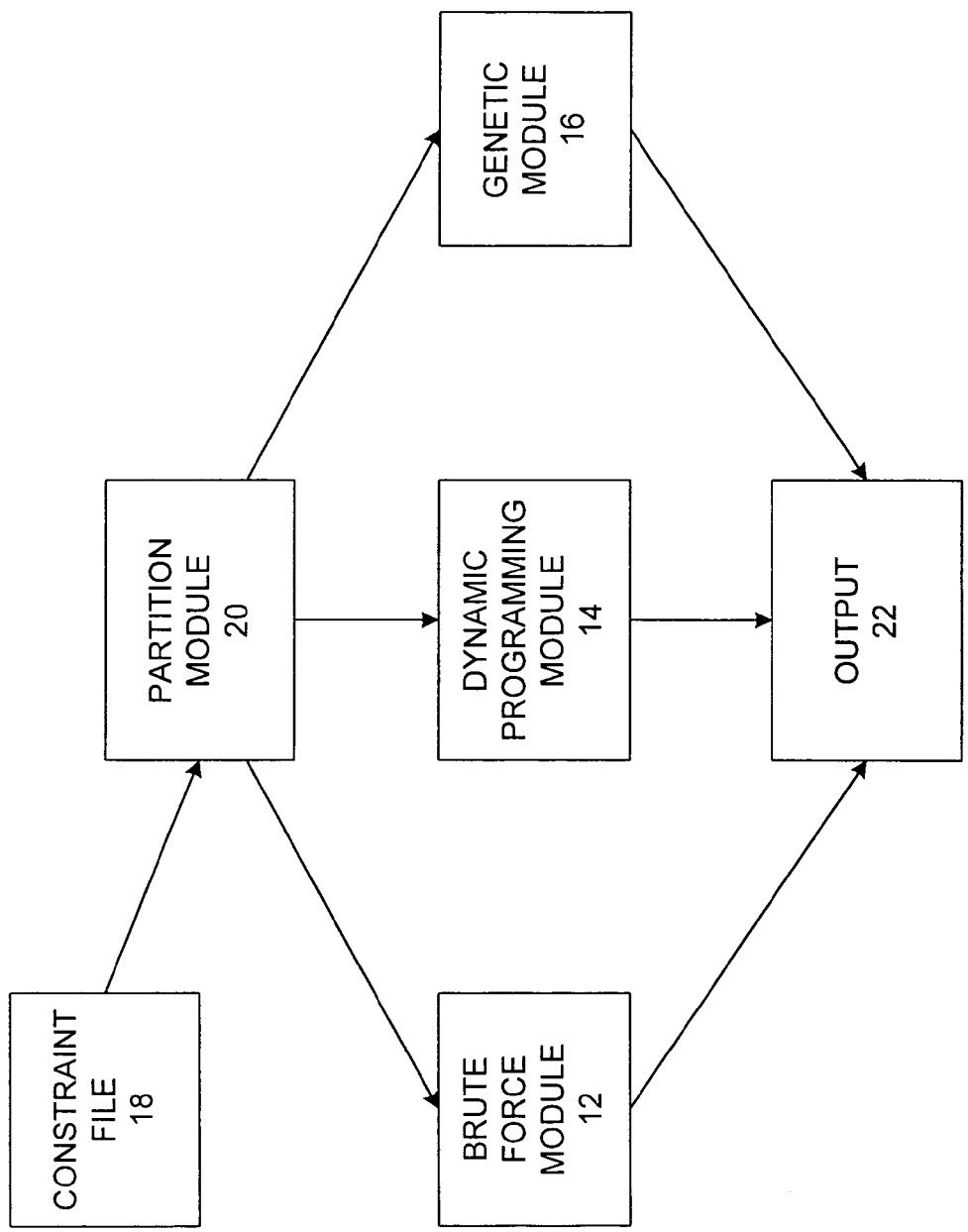
FIG. 1 is a flow chart showing the relationship, in the present invention, between the enumerative module, dynamic programming module, genetic module and the selecting means.
Figure 2:
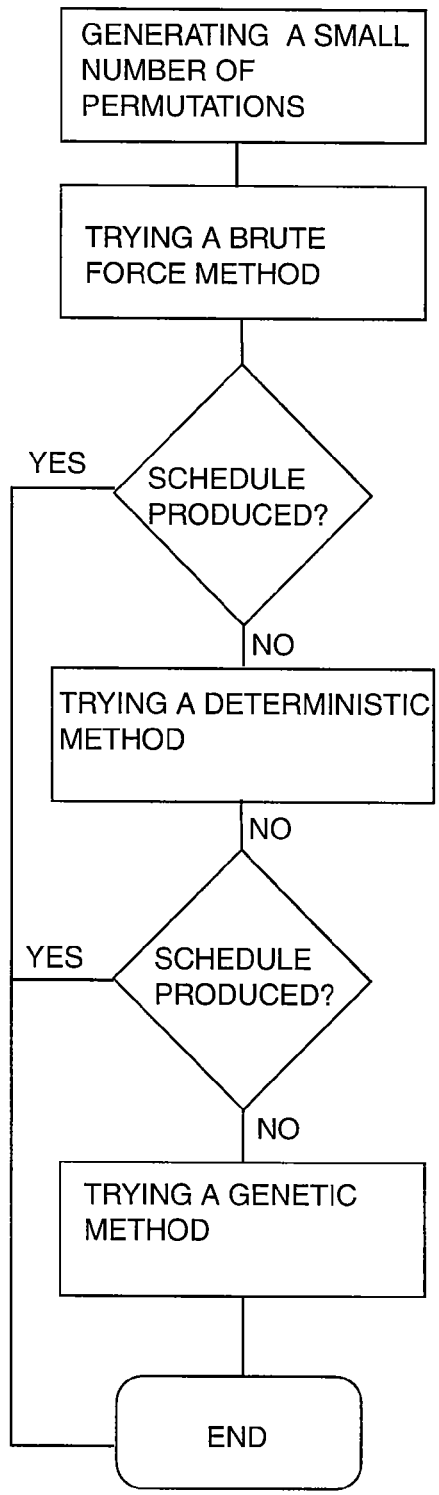
FIG. 2 is a flow chart showing the process of generating a small number of permutations, trying a brute force method, if not then trying a deterministic method, and if not then trying a genetic method.

In the following description, like reference characters designate like or corresponding parts in the schematic of the invention. Also in the following description, it is to be understood that any such terms as "forward," "rearward," "left," "right," "upwardly," "downwardly," and the like are words of convenience and are not to be construed as limiting terms.

Referring now to FIG. 1, it will be understood that the illustration is for the purpose of describing a preferred embodiment of the invention and is not intended to limit the invention thereto. As best seen in FIG. 1, the scheduling system 10 includes a brute force module 12, a dynamic programming module 14, and a genetic module 16. A user-defined constraint file 18 is down loaded into the partition module 20, which then evaluates the constraints and selects the module that is most suited to create the best schedule in the amount of time allowed by the user. The selected module then solves the problem, yielding an output 22 that represents the solution to the scheduling problem.

The brute force module 12 simply searches (i.e., enumerates) every possible solution within the solution space. For example, the module 12 enumerates all of the following permutations for the letters a, b, and c: abc; acb; bac; bca; cab; and cba. The module 12 searches all of the permutations by performing the following steps: (1) cycling the first position through all the possible elements; (2) cycling the second position through all the remaining elements; (3) cycling the third position through all the remaining elements; and so on. The time it takes the brute force module to examine a schedule increases exponentially as the number of tasks increases linearly, so using the brute force module is only feasible on relatively small problems. While the brute force module 12 is not practical for most real-world problems, as the search space is too large to be enumerated, it produces high quality schedules—where the term "quality" is by determined by a user-defined metric, such as the time required to complete the schedule or the amount of money required by the schedule—by examining every possible schedule permutation and then selecting the best overall schedule.

An exact dynamic programming solution to the TDTSP requires exponential CPU time and memory as the number of cities increases. These requirements cannot be met for any TDTSP with more than a few dozen cities. The restricted dynamic programming heuristic of the prior art reduces the time and memory requirements by retaining at the end of each stage only the H lowest-cost unique partial tours generated during that stage, where H is user-defined. In the present invention, for any stage i, each of the H lowest-cost unique partial tours saved at the end of stage i–1 is used to construct all possible tours that contain one additional city not yet visited. For a TDTSP with n cities, there are H(n–i) partial tours constructed at each stage i. The H unique, lowest-cost partial tours are then saved to start the next stage.

The prior-art dynamic programming heuristic spends a significant amount of CPU time sorting to identify and eliminate duplicate values at the end of each stage. In contrast, the dynamic programming module of the present invention uses hash functions to detect when duplicate values have been generated. A hash array stores the H lowest-cost partial tours generated during each stage. Each tour's position in the hash array is determined by using a bit vector holding the key to a simple hash function. Double hashing with linear probing is used to resolve collisions.

A new partial path is inserted into the hash array to pass the values of S and k to hash_1, a hash function that computes the initial position of the tour in the hash array. If a collision is detected at the position returned by hash_1, the DP module first determines whether the tour currently occupying that position in the hash array has the same values of S and k as the tour to be inserted. If so, the tour in the hash array is replaced only if the current tour has a lower cost, by the principle of optimality.

If a collision is detected at the hash array position returned by hash_1 but the values of S and k are different, a second hash function, hash_2, is called to try a different position in the hash array. If another collision is detected in the hash array at the position returned by hash_2, and the values of S and k differ, linear probing is used. Linear probing continues until either duplicate values of S and k or an empty slot in the hash array is found. Collisions occur infrequently in practice, however, since both hash_1 and hash_2 use the "division method" to distribute paths evenly in the hash array. The size of the hash array is a carefully chosen prime number not too near an exact power of 2, thereby additionally reducing the possibility of collisions.

The prior-art dynamic programming heuristic uses temporary arrays to hold the partial paths generated during each stage. The size of these arrays represent a tradeoff between longer running times with higher memory usage, and overall solution quality. Larger arrays require more memory and take more CPU time to identify duplicates, but produce better solutions. Smaller arrays mean the heuristic can run faster, but produces lower-quality solutions. The dynamic programming module of the present invention avoids this tradeoff altogether by using AVL trees, in conjunction with the hashing procedures described above, thereby eliminating these temporary arrays and only storing the H lowest-cost partial paths generated during each stage.

AVL trees are height-balanced binary trees that provide efficient search, insertion, and deletion operations while storing a large number of nodes. Each node in the AVL tree stores both the partial path cost and a pointer to the path's entry in the hash table structure. The partial path cost is used as the key value for comparisons. This enables the element in the tree with the worst cost to be determined by simply finding the rightmost node in the tree.

When a new partial path is created during a stage, the DP module 14 of the present invention first computes the partial path's cost. If the cost is less than the $H^{th}$ worst-cost partial path already stored in the AVL tree, the modified heuristic then uses the hash functions to check whether the new path has the same values of S and k as any other path already stored. If the new partial path passes this inspection, it is inserted into the AVL tree and the hash array. The complete heuristic for the DP module is given in Table 1.

In the DP module 14 of the present invention, a partial path can be deleted from the AVL tree and hash array under certain circumstances. This occurs when H elements are already stored and a unique partial tour is generated which has a cost lower than that of the $H^{th}$ lowest-cost element in the hash array. In this situation, the element with the $H^{th}$ lowest-cost is deleted from the hash array and the AVL tree, and the new partial tour is inserted.

TABLE 1

The Dynamic Programming Heuristic

Step 0. |S| = 0.
Step 1. |S| = |S| + 1. If |S| = n, go to Step 8.
Step 2. Compute the arrival times of partial tours in the current stage by adding to each partial tour of the previous stage one more node k, for all non-visited k.
For each partial tour, if the partial arrival time is less than the partial arrival time of the worst retained partial tour in the current stage so far, go to Step 4.
Step 3. If not all partial tours are examined yet, go to Step 2. Otherwise, go to Step 7.
Step 4. Use the hash functions to determine if the S and k values of this partial tour are already stored in the hash array. If the values of S and k are unique, go to Step 5.
If the values of S and k are the same as some other path already stored, and the partial arrival time of the new path is less than the stored partial arrival time, go to Step 6.
Otherwise, go to Step 3.
Step 5. Insert the partial path into the hash array and the AVL tree. Go to Step 3.
Step 6. Delete the partial path with the higher cost from the AVL tree and hash array. Insert the new partial path in the same position in the hash array. Also insert the new path in the AVL tree.
Go to Step 3.
Step 7. Using the AVL tree and hash array, write on disk the values of k and Pred for current stage. Go to Step 1.
Step 8. Return to the depot from each partial tour and update the cost of each (now complete) tour in Cost. To trace back best solution tours, start with the final values of k and Pred for the lowest cost complete tours. Read from disk the tours' k and Pred entries in each previous stage until no more stages remain.

When searching for duplicate values of S and k in the hash array, it is not sufficient to terminate the search when an empty slot in the hash array is found.

To avoid this problem, an integer counter is attached to each slot in the hash array. The collision counter is set to zero at the beginning of every stage. Each time a collision occurs at a slot while attempting to insert an element, the collision counter at the slot is incremented. If the element at the slot is deleted during the stage, the collision counter at that slot is not reset. When inserting an element into the hash array, a new tour can immediately be placed into a slot only if the slot is empty and the collision counter at the slot is 0. If the slot is empty but the collision count is greater than 0, then the insertion algorithm knows that at least two other tours hashed to slot earlier in this stage, and one of them may have been placed elsewhere in the hash array. One of these previous tours may still be in the hash array and contain the same values of S and k as the current tour. The insertion algorithm calculates the hash_2 position of the current tour to see whether a duplicate tour exists at that slot in the hash array. If the collision counter at that position is not zero, linear probing will be used to determine whether a duplicate tour exists. Only the next collision count slots need be examined using linear probing, since all collisions from the hash_2 function would have been resolved through linear probing.

In terms of schedule quality, the dynamic programming module generally creates the next-best schedules, after the brute force module. The DP module 14 does not examine every schedule permutation, so it is not guaranteed to return the optimum schedule. The DP module 14, however, is able to work with a larger number of tasks than is the BF module 12. Where the time vs. quality tradeoff favors time, the DP module 14 is generally the best choice. The DP module 14 also requires a larger amount of computing resources as the number of tasks increases. Where insufficient resources are available, the genetic module 16 is used.

The genetic module 16 is generally used when the computing resources available (e.g., memory, disk space, processor speed, or time) precludes the use of the other modules. While the quality of the solutions generated by the genetic module is generally lower than that of the other modules, the genetic module 16 can generate schedules for many more tasks. In addition, the genetic module 16 may produce higher quality schedules than the other modules when the number of constraints on the tasks is high.

The genetic module 16 of the present invention includes a genetic algorithm (GA) which implements eight well-known genetic operators, plus adaptive operator probabilities and population re-initialization mechanisms to determine which combination of operators and mechanisms produces the best solutions to a randomly generated TDTSP. The GA is started by creating an initial solution using a dynamic programming (DP) heuristic. This heuristic avoids the exponential CPU and memory requirements of an exact DP algorithm by retaining in memory only a user-defined number of partial solutions. Retaining more partial solutions generally results in better overall solutions, and storage of tens of thousands of partial solutions to generate good results is not uncommon. In the GA of the preferred embodiment, the DP heuristic is allowed to retain 10 partial solutions in memory at each stage. This initial solution is added to the GA population, where the chromosomes are permutations of the n−1 integers representing the tasks to be scheduled. The remaining members of the population are initialized with random paths.

In the preferred embodiment, binary tournament selection is used to select members of the population for reproduction. Either one or two parents are chosen, depending on the operator selected for that generation. Operator selection is performed randomly where the likelihood of an operator being selected is determined by its associated probability.

During each generation, the decision of whether to retain a new individual o in the population is made using a (P+1) reproduction approach. The costs of o and q, the member of the population with the highest cost tour, are compared and if o has a lower cost than q, then q is deleted from the population and o retained.

The operators chosen for the GA of the preferred embodiment have been shown to be effective on either the TSP or vehicle routing problems similar to the TDTSP. A variety of mutation and local search operators have been implemented, and a brief description of each of the operators used follows. The term "cities" is used in the following discussion as an example of a travel-related scheduling problem, and is not intended to limit the present invention. In general, any type of time-dependent task can be scheduled.

Edge Recombination (ER): Edge recombination has been shown to be effective on certain kinds of scheduling problems. Edge recombination produces a single offspring from two parent paths. The GA of the present invention implements a modified version of edge recombination in which a greedy heuristic, rather than random selection, is used to resolve ties when recombination becomes blocked. The greedy heuristic estimates the cost of visiting each of the remaining unvisited cities from the current city. The remaining city with the lowest cost becomes the next city to be visited, and edge recombination resumes.

Merge Crossover (MX): Originally proposed for vehicle routing problems, merge crossover seeks to preserve in one offspring any global precedence of cities found in the offspring's two parents. That is, for any two cities i and j, if city i appears before city j in both parents, then city i must appear before city j in the offspring. While some implementations receive global precedence information from an external source (e.g., a global precedence table), the implementation in the preferred embodiment seeks to discover global precedents in the parents instead of using an external table.

Cycle Crossover (CX): Cycle crossover produces a single offspring from two parent paths and is designed to preserve in the offspring the absolute position of each city in the parents. Thus, any city k in position m in the offspring must also appear in position m in one of the parents.

Scramble Sublist Mutation (SSM): Scramble sublist mutation produces one offspring from one parent by randomly selecting a sublist of cities from the parent and randomly repositioning the cities within the sublist of the offspring.

Uniform Order-based Mutation (UOM): Uniform order-based mutation is a unary operator that works by exchanging in the offspring the positions of two randomly selected cities in the parent.

Non-Uniform Order-based Mutation (NOM): Similar to uniform order-based mutation, the non-uniform variant also produces one offspring from one parent. In the non-uniform version, however, the average difference between the positions of the two cities to be swapped decreases as the number of generations processed increases. The implementation in the GA of the preferred embodiment begins by selecting one city at random. The position of the second city to be swapped is calculated using the following function adapted from:

$$\text{Distance from city } 1 = y \cdot r \cdot \left(1 - \frac{t}{T}\right)^b$$

where $y=n-1$, r is a random number in [0,1], T is the maximal generation number, t is the current generation number, and b is a user-defined parameter used to control the degree of nonuniformity. In the preferred embodiment, the value of b is set 1.4 for our implementation.

Uniform Local Search (ULS): The uniform local search operator is based on a scramble sublist mutation operator. While scramble sublist randomizes the positions of cities within a sublist of the offspring's path, the uniform local search operator computes the cost of every permutation of the cities in a parent's sublist, then assigns to the offspring the one sublist permutation which minimizes the overall cost of the tour.

While the uniform local search operator is guaranteed to find the lowest cost permutation, the processing time of the operator grows factorially as the length of the sublist grows linearly. The GA the preferred embodiment therefore uses a sublist of length 6, and thus evaluates a total of 720 permutations each time the uniform local search operator is called.

Non-Uniform Local Search (NLS): Unlike a uniform local search, the cities selected by the non-uniform local search operator are chosen randomly from the entire path. In this manner, each permutation of the selected cities is created and the corresponding path cost is calculated. The offspring is assigned the path corresponding to the permutation of the selected cities that minimizes the overall cost of the tour. As with the uniform local search operator, non-uniform local search works with just 6 cities to keep the CPU time required by this operator at a reasonable level.

In addition to the operators described above, the GA of the preferred embodiment implements two special-purpose mechanisms to test their effectiveness on the TDTSP: adaptive operator probabilities and population reinitialization. Using adaptive operator probabilities allows the GA to adjust the relative probabilities of each operator according to how much relative improvement that operator has contributed to the current population. The GA implements an adaptive operator probabilities (ADOPP) mechanism. A brief discussion of how ADOPP adjusts each operator's probabilities follows.

For each offspring created that has a cost lower than the median cost of the current population, ADOPP assigns credit to each operator that helped build that offspring, where the amount of credit assigned is a user-defined constant. The operator that directly creates the improved offspring, known as the immediate operator, gets the maximum amount of credit, while the operators that generated the offspring's parents get some reduced amount of credit. Credit can be assigned to several generations of ancestors, where the number of ancestor generations and rate of credit decay are user-defined.

Since ADOPP must assign credit to each operator that contributes to a fit offspring, ADOPP keeps track of an operator tree for each member of the current population. This operator tree records the operators that generated the individual and its ancestors for a fixed number of prior generations. When a binary operator is applied, for example, ADOPP copies the operator trees of each parent into the left and right subtrees of the offspring's operator tree, discarding each parent's leaf nodes. The current operator becomes the new root. In the preferred embodiment, the GA records a maximum of four generations of ancestor operators for each offspring.

In addition to operator trees, ADOPP also maintains a queue that keeps track of each operator's contributions to the population for some user-defined number of most recent previous generations. After a new individual is added to the population, ADOPP recomputes the probability of selection of each of the m operators in the next generation according to the following formula:

$$\text{Probability of operator } op = \frac{Cr[op]}{N[op]} / \sum_{i=1}^{m} \frac{Cr[i]}{N[i]}$$

To ensure that all operators continued to participate in the GA, the minimum probability of any operator is preferably set to 5%.

In addition to adaptive operator probabilities, the GA also implements the "population reinitialization" mechanism. Population reinitialization is a method of introducing diversity into a population that may have converged prematurely. Reinitialization works by creating a new population where only a few of the best individuals from the old population are copied to the new, and the rest of the new population is created at random. This mechanism has been shown to give good results on problems that use small population sizes. The implementation of reinitialization copies only the individual with the lowest overall cost from the old population into the new. In the preferred embodiment, reinitialization takes place once 2,500 generations have passed without a new member having been added to the population.

After a pool P of schedules is created, each of the schedules in P must be evaluated to the schedule's fitness. The enumerator module 12, dynamic programming module 14, and genetic module 16 include a schedule—or fitness function—evaluator. In the example fitness function shown below in Table 2, the cost of a given schedule is measured in minutes, and consists of three parts: the time it takes to walk to the ride, plus the time the customer can expect to wait in line at each ride, plus the number of minutes the ride lasts.

TABLE 2

A Sample Fitness Function

```
Function Cost( p, W, D, R, t_a, t_d, t_o, w_w, w_a)
  Begin
    Initialize tour_cost to 0
    Initialize clock to t_a, the customer's arrival time at the park
    If t_a = park opening time t_o then
      tour_cost = tour_cost + (walk time from end of Main Street to
        first ride * w_w)
      clock = clock + (walk time from end of Main Street to
        first ride * w_w)
    Else
      tour_cost = tour_cost + (walk time from park entrance
        to first ride * w_w)
      clock = clock + (walk time from park entrance to first ride * w_w)
    Endif
    For each ride r in p do
      tour_cost = tour_cost + (wait time at r * w_a)
      clock = clock + (wait time at r * w_a)
      tour_cost = tour_cost + ride time at r
      clock = clock + ride time at r
      If r is not the last ride in p then
        tour_cost = tour_cost + walk time from r to next ride in p
        clock = clock + walk time from r to next ride in p
```

TABLE 2-continued

A Sample Fitness Function

Endif
Done

The cost function accepts the following input parameters:
p: a TP in P
W: the wait time matrix
D: the distance matrix
R: the ride time matrix
$t_a$: the time of day the customer will arrive at the park.
$t_d$: the time of day the customer will depart the park.
$t_o$: the time of day the park will open.
$w_w$: the relative preference the customer has for walking versus waiting in line.
$w_a$: the relative preference the customer has for waiting in line versus walking.

It is important for the heuristics to be able to generate solutions to constrained TDTSPs because many real-world problems include constraints. The constraint file 18 includes those constraints to be considered in obtaining a solution to a scheduling problem. In the Preferred Embodiment, both the dynamic programming heuristic and genetic algorithm are modified to satisfy two different types of constraints for the TDTSP.

Two obvious types of constraints for the TDTSP—precedence constraints and time windows—are considered in the Preferred Embodiment. The precedence constraints impose a partial order on two or more cities within a given solution, and are stated as rules of the form "City x must be visited before city y", where x≠y and y≠0. Time windows, on the other hand, are constraints that specify the range of time during which it is permissible to perform a given task (e.g., "Visit city 41 between 2:00 p.m. and 4:00 p.m."). The time window starts at the arrival time, and expires after the time window duration has expired.

There are several common ways for genetic algorithms to handle constraints: penalty functions, repair methods, and specialized operators. Penalty functions are the most frequently implemented method of handling constraints in GAs. In its simplest case, a penalty function has the form:

$$eval(x) = \begin{cases} f(x), & \text{if } x \text{ is feasible} \\ f(x) + \text{penalty}(x), & \text{otherwise} \end{cases}$$

where the penalty function evaluates to zero if no constraints are violated. This basic penalty function provides great latitude in the computation of an appropriate penalty to impose for violated constraints. Static methods assign different penalties to constraint violations based upon the severity of the violation, whereas dynamic penalty functions, impose larger penalties on infeasible solutions as the number of generations processed increases. In the preferred embodiment of the present invention, a static penalty function in which the penalty function assigns different levels of penalty based on the severity of the violation is implemented. For example, a candidate solution that violates a single time window constraint by only a few minutes is penalized much less severely than a candidate solution that violates a time window constraint by several hours. Similarly, candidate solutions that violate both precedence constraints and time window constraints are penalized more than solutions that violate only precedence constraints. The complete penalty function is:

Penalty(x)=(Number of Precedence Constraints Violated*

Precedence_Constraint_Violation_Penalty)+[(Number of Time

Window Constraints Violated*

Time_Window_Constraint_Penalty)+Total Number of Minutes

Time Windows Were Missed]

where Time_Window_Constraint_Penalty and

Precedence_Constraint_Violation_Penalty are user-defined constants.

One of the attributes of a good penalty function is that the fitness of all infeasible solutions should be worse than the least-fit feasible solution. This attribute ensures that any feasible solution will be chosen for reproduction more often than any infeasible one. To implement this, a static penalty of 10,000 minutes is added to all infeasible solutions.

The partitioner module (PM) 20 is the module responsible for deciding whether the brute force, dynamic programming, or genetic module will generate the schedule. The PM 20 receives input from the constraints file 18. The input includes the number of tasks to be scheduled and the maximum amount of time allowed to generate the schedule. In addition, a hardware resource calculator generates input for the PM 20 concerning the amount of available physical memory and disk space.

The PM 20 first generates a small number of schedule permutations (e.g., 100 or 1000 possible schedules) using the BF 12 module. Based on the time it takes the BF module 12 to process this small number of schedules, the PM 20 estimates T, the time the BF module would require to generate all the schedule permutations for the number of tasks to be schedule. If T is less than the maximum amount of time the computer is allowed to take to generate the schedule, the PM 20 selects the BF module 12 to produce the schedule. Otherwise, the PM 20 goes to the second step.

In the second step, the partitioner module 20 starts the DP module and times how long the DP module 14 takes to schedule a small number of tasks. The PM 20 also watches the DP module 14 to estimate how much memory and disk space the DP module 14 would require computing the entire schedule. If the DP module's 14 resource requirements can be met and the schedule can be complete in the time allotted, the DP module 14 is selected. Otherwise, the genetic module 16 is selected.

Certain modifications and improvements will occur to those skilled in the art upon a reading of the foregoing description. By way of example, transportation and scheduling problems could include a "balking factor" constraint. This "balking factor" would represent the maximum amount of time the user is willing to wait for a given task to be completed. For example, a user may specify that he or she wants to go from point A to point B, but only if he or she does not get stuck in traffic for more than 45 minutes. In this example, 45 minutes is the "balking factor." Also, each task may include an optional priority (e.g., high, medium, or low), and the user-defined fitness function may, in a straight-forward fashion, determine which schedule is most acceptable, taking into account the possible tradeoffs between schedule efficiency and task priority. For example, if the user specifies that ten tasks must be scheduled during a five hour span, but it is impossible to complete all ten tasks in five hours, the scheduler can try to ensure that the highest-priority tasks get accomplished during the five hour span, leaving lower-priority tasks out of the schedule. In addition, it is straightforward to add or remove constraints or tasks dynamically (i.e., "on the fly"), and have the scheduler restart or re-do the schedule. It should be understood that all such modifications and improvements have been deleted herein for the sake of conciseness and readability but are properly within the scope of the following claims.

I claim:

1. An Apparatus for producing a schedule of a plurality of time dependent tasks comprising:

means for receiving and storing a plurality of tasks to be scheduled;

means for receiving and storing a maximum amount of time allowed to schedule the plurality of tasks:

means for generating only a portion of a number of schedule permutations required to produce an optimal schedule of the plurality of tasks using an enumerative brute force method;

means for estimating an amount of time required to generate the number of schedule permutations required to produce the optimal schedule from the amount of time used to generate the portion of the number of schedule permutations;

means for determining whether the estimated amount of time is greater than the maximum amount of time allowed to generate the schedule;

means for producing the optimal schedule using the enumerative brute force method if the estimated amount of time required is not greater than the maximum amount of time allowed to schedule the plurality of tasks;

means for generating only a portion of a number of schedule permutations required to produce a schedule of tasks using a deterministic programming method if the optimal schedule is not get produced;

means for estimating an amount of time required to generate the schedule of the plurality of tasks to be scheduled using the deterministic programming method based on the amount of time required to schedule the portion of the plurality of tasks using the deterministic programming method if the optimal schedule is not yet produced;

means for estimating an amount of memory space required to schedule the plurality of tasks using the deterministic programming method based on the amount of memory space required to schedule the portion of the plurality of tasks using the deterministic programming method if the optimal schedule is not yet produced;

means for determining whether the estimated amount of time required to generate the schedule is greater than the maximum amount of time allowed to schedule the plurality of tasks if the optimal schedule is not vet produced;

means for determining whether the estimated amount of memory space required to generate the schedule is greater than a maximum amount of memory space if the optimal schedule is not vet produced;

means for generating the schedule of the plurality of tasks to be scheduled using the deterministic programming module if the estimated amount of time required to generate the schedule is not greater than the maximum amount of time allowed to generate the schedule and the estimated amount of memory space is not greater than the maximum amount of memory space and the optimal schedule is not yet produced; and means for generating the schedule using a genetic method if the estimated amount of time required to generate the schedule is greater than the maximum amount of time allowed or the estimated amount of memory space is greater than the maximum amount of memory space and the optimal schedule is not yet produced.

* * * * *

UNITED STATES PATENT AND TRADEMARK OFFICE
CERTIFICATE OF CORRECTION

| | |
|---|---|
| PATENT NO. | : 7,246,075 B1 |
| APPLICATION NO. | : 09/602515 |
| DATED | : July 17, 2007 |
| INVENTOR(S) | : Leonard J. Testa |

It is certified that error appears in the above-identified patent and that said Letters Patent is hereby corrected as shown below:

Column 4, Line 30, "drawing" should be --drawings--

Column 13, Line 40, "get" should be --yet--

Column 14, Line 18, "vet" should be --yet--

Column 14, Line 21, "vet" should be --yet--

Signed and Sealed this

Twenty-first Day of August, 2007

JON W. DUDAS
*Director of the United States Patent and Trademark Office*